United States Patent [19]

Budecker et al.

[11] Patent Number: 4,843,193
[45] Date of Patent: Jun. 27, 1989

[54] RESERVOIR FOR A HYDRAULIC BRAKE SYSTEM

[75] Inventors: Ludwig Budecker, Frankfurt am Main; Gerd Klostermann, Friedrichsdorf, both of Fed. Rep. of Germany

[73] Assignee: Alfred Teves GmbH, Frankfurt am Main, Fed. Rep. of Germany

[21] Appl. No.: 173,977

[22] Filed: Mar. 28, 1988

[30] Foreign Application Priority Data

Apr. 4, 1987 [DE] Fed. Rep. of Germany ....... 3711369

[51] Int. Cl.$^4$ .............................................. H01H 35/18
[52] U.S. Cl. ..................................... 200/84 C; 73/308; 340/624; 200/51 R
[58] Field of Search .................. 307/118; 340/59, 612, 340/618, 623, 624; 73/307, 308, 313, 319; 200/51 R, 61.2, 84 R, 84 C; 335/205

[56] References Cited

U.S. PATENT DOCUMENTS

| | | | |
|---|---|---|---|
| 3,976,963 | 8/1976 | Kubler | 200/84 C |
| 4,037,193 | 7/1977 | Uemura | 200/84 C |
| 4,301,440 | 11/1981 | Kubota | 200/84 C |

FOREIGN PATENT DOCUMENTS

| | | |
|---|---|---|
| 1615911 | 10/1970 | Fed. Rep. of Germany .... 200/84 C |
| 1780477 | 3/1971 | Fed. Rep. of Germany . |
| 3016434 | 4/1980 | Fed. Rep. of Germany . |
| 2948984 | 6/1980 | Fed. Rep. of Germany . |
| 3021434 | 2/1985 | Fed. Rep. of Germany . |
| 3328534 | 2/1985 | Fed. Rep. of Germany . |
| 2078010 | 12/1981 | United Kingdom .............. 200/84 C |

Primary Examiner—Gerald P. Tolin
Attorney, Agent, or Firm—James B. Raden

[57] ABSTRACT

To improve the denseness of a reservoir telltale sounding device of a reservoir for a hydraulic brake system, while reducing the costs of manufacture and assembly, the plug portion comprises a first face and a second face which are respectively connected, in liquid-tight manner, to the housing of the reservoir telltale sounding device and the cover.

5 Claims, 2 Drawing Sheets

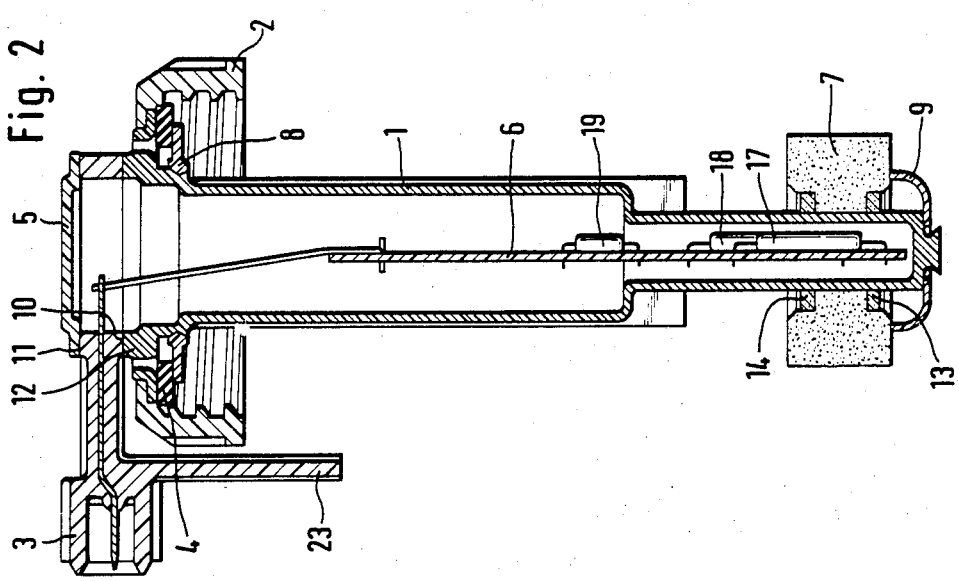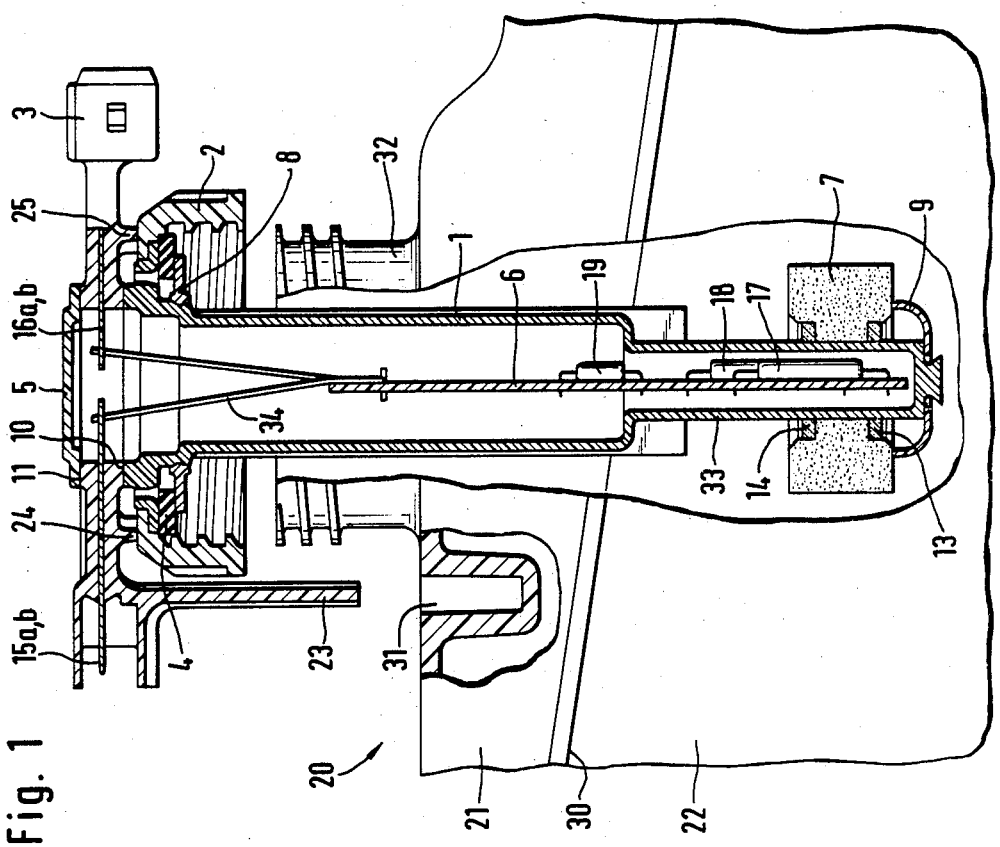

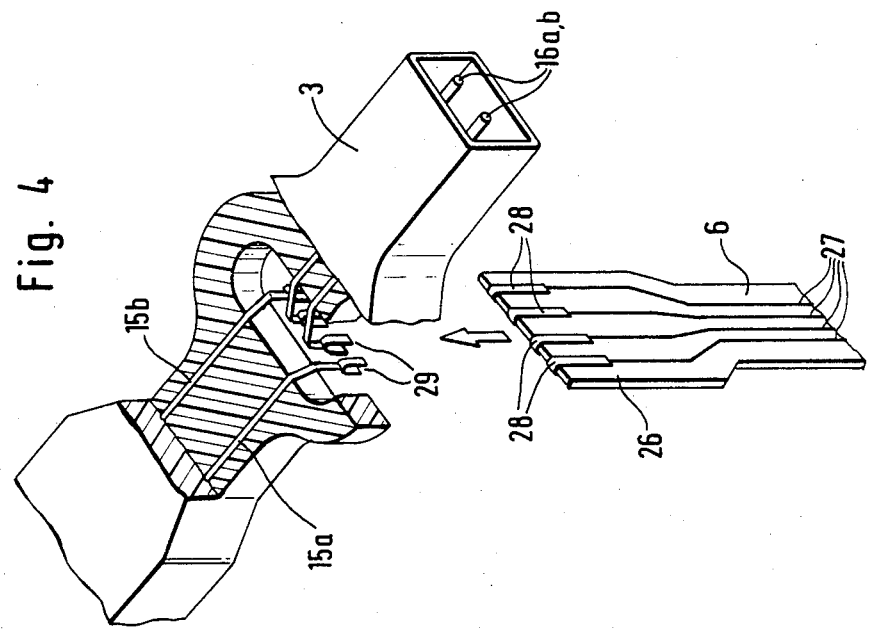
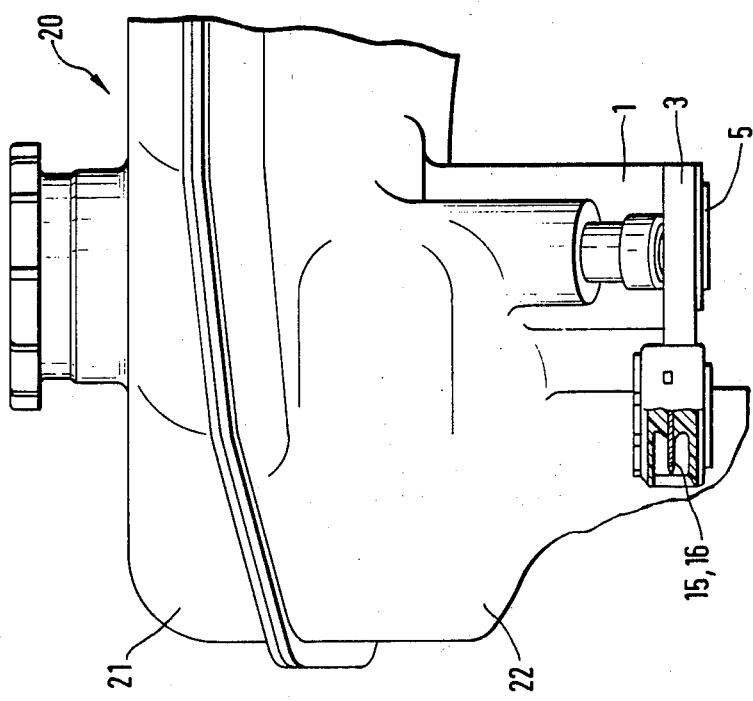

RESERVOIR FOR A HYDRAULIC BRAKE SYSTEM

BACKGROUND OF THE INVENTION

The present invention relates to a reservoir for a hydraulic brake system provided with a screw coupling and a reservoir telltale sounding device comprising a tubular housing containing a guide section. A printed circuit board is located in the housing and is furnished with at least one reed contact and a float slidingly straddling the guide section and being provided with at least one magnet. Conduits are provided for connecting the printed circuit board to a plug portion containing a plurality of contact lugs, and of a cover closely sealing the housing.

In conventional reservoirs of this type, the housing comprises one or more slots through which is plugged the plug portion which is typically formed by two separate plugs. The contact lugs of the plug portion are retained by the cover welded to the housing. The disadvantages of these conventional reservoirs are the leakage problems occuring on passage points of the plugs thereby causing, through the ingress of moisture into the interior of the housing, substantial malfunctions of the reservoir telltale sounding device. To preclude malfunctions of this type, the housing is provided with silicone fillings which, however, incur substantial cost. In a one-sided configuration of the plug portion, the more expensive silicone filling is replaced by an O-ring for sealing the plug. However, that solution nevertheless does not overcome the problems of denseness.

SUMMARY OF THE INVENTION

It is, therefore, the object of the present invention to improve a reservoir of this type to the effect that, while overcoming the disadvantage thereof, a substantially improved denseness is attained, and the cost of manufacture and assembly is also reduced.

This object, in the practice of the present invention, is achieved in that the plug portion comprises a first face and a second face which are respectively connected, in liquid-tight manner, to the housing and the cover. In an advantageous embodiment of the present invention the housing is connected in fixed or locking manner to the threaded engagement, with the connection being effected in that the housing is provided with a radial flange-type retaining member which, by inserting a sealant, is in axial alignment with the threaded engagement. This measure insures a simple and reliably operating design of the invention facilitating, notably, ease of assembly.

To improve the denseness of the interior of the housing, it is provided in accordance with the invention that the housing is provided with a radial sleeve to which the first surface of the plug portion is welded whereas the cover is welded to the second surface of the plug portion. A substantial simplification is achieved wherein the plug portion is integrally formed with the covering and that the printed circuit board is provided with an axial extension the conductor lines of which, in the form of a plug-type connection, cooperate with the ends of the contact lugs provided as contact shoes.

To limit the axial movability of the screw coupling during assembly, it is provided, according to another feature of the invention, that the plug portion has at least two projections which, in plan view, are of a circular segment-type configuration, with the faces thereof disposed at a small axial distance from the screw coupling. Finally, an advantageous embodiment of the reservoir of the present invention provides that the plug portion is provided with a positioning portion molded thereto and which cooperates with a corresponding recess of the reservoir. This measure ensures an accurate positioning of the plug portion in the mounting chamber of the reservoir in accordance with the present invention.

BRIEF DESCRIPTION OF THE DRAWING

Further features and advantages of the present invention are set forth in the following description of two preferred embodiments with reference to the accompanying drawing, wherein:

FIG. 1 is a longitudinal section through a first preferred embodiment of the reservoir according to the present invention;

FIG. 2 illustrates an alternative embodiment of the reservoir telltale sounding device of the reservoir according to the present invention;

FIG. 3 is a perspective view of a second embodiment of the device in accordance with the present invention; and, FIG. 4 is a perspective view of a preferred embodiment of the plug portion along with a section through a partial area thereof.

DETAILED DESCRIPTION OF A PREFERRED EMBODIMENT

The reservoir 20 as shown in the drawing comprises an upper portion 21 and a bottom portion 22 interconnected, such as by welding techniques, in a liquid-tight manner, along a separating line 30 obliquely extending in the longitudinal direction. The upper portion 21 comprises a filler nozzle 32 provided with a screw thread which is sealed by means of a screw coupling 2. The screw coupling 2 comprises an aperture of larger diameter through which protrudes a tubular housing 1 of a reservoir telltale sounding device into the interior of the reservoir. The end of housing 1 facing the interior of the reservoir 20 and forming a guide section 33 is provided with a stop 9 limiting the axial movement of a float 7 provided with two permanent magnets 13, 14. At the other end thereof, the tubular housing 1 is provided with a radial flange-type retaining member 8 buttoned into a circumferential groove of the housing 1 and which by inserting a flat sealant 4, is in abutment with the screw coupling 2. The housing end protruding from the screw coupling 2, comprises a radial sleeve 12 which is connected, such as by welding or cementing techniques, in liquid-tight manner, to a first surface 10 of a plug portion 3 comprising an axial bore. To seal the axial bore of the plug portion 3, a second surface 11 is provided, which is welded or cemented to which is a cover 5.

To limit the axial movability of the screw coupling 2 and to preclude jamming thereof during assembly of the reservoir telltale sounding device, the plug portion 3, at the side facing the screw coupling 2, comprises two opposite projections 24, 25 of a circular segmental configuration, the faces of which are located at a small distance from the screw coupling 2. Proper positioning of the plug portion 3, during assembly, is ensured by a positioning portion 23 molded thereon and, in assembled condition of the reservoir telltale sounding device, engages a recess 31 provided in the upper portion 21 of the reservoir 20.

In order to provide that the signals of the reservoir telltale sounding device are passed on to an analyzer circuit, the plug portion 3 is further provided with a plurality of contact lugs 15a, b; 16a, b located in a plane extending in parallel to the two faces 10, 11 and electrically connected, through conduits 34, to the conductor lines of a printed circuit board 6 disposed in the interior of the housing and which is provided with two reed contacts 17, 18 and a resistor 19. Although, in this instance, the contact lugs 15a, b are located opposite the contact lugs 16a, b, (FIG. 1), it is also be possible for all contact lugs 15, 16 to be arranged in side-by-side relationship. That arrangement is shown in FIG. 2 and provides a simplification of the plug portion 3.

In the preferred second embodiment as shown in FIG. 3, the housing 1 of the reservoir telltale sounding device is formed of a tubular portion molded to the bottom part 22 of the reservoir 20 according to the present invention, with the tubular portion, preferably, being manufactured integrally with the bottom portion 22 in one operation. This measure further reduces the manufacturing cost.

Finally, FIG. 4 shows another particularly advantageous embodiment of the plug portion 3, wherein the cover 5 (not shown) is formed integrally with the plug portion 3, with the printed circuit board 6 comprising an extension 26 on which the conductor lines 26 pass over into a plug connection 28 cooperating with corresponding contact shoes 29 formed at the ends of the contact lugs 15a, b; 16a, b. This measure enhances operating safety of the reservoir telltale warning device as problems possibly caused by cold junctions are avoided.

What is claimed is:

1. In a supply reservoir assembly including a supply reservoir having a threaded filler nozzle; a reservoir telltale device comprising an elongate hollow tubular housing closed at one end and open at its other end, a screw coupling member rotatably mounted on said housing adjacent said other end and being threadably engageable with said nozzle to mount said housing on said reservoir with said one end of said housing located within said reservoir, electrical circuit board means mounted within said housing and having a switch connected thereto, an electrical plug member having first and second opposed surfaces and having a bore extending into said member from said first surface, electrical connection means sealed in said plug member and projecting into said bore and from the exterior of said plug member to establish an external electrical connection to said circuit board means, means fixedly and sealingly securing said other end of said housing to said first surface of said plug member with said bore opening into said housing, means fixedly and sealingly closing the end of said bore remote from said first surface, and means on said plug member engageable with said reservoir for locking said plug member and housing against rotation relative to said reservoir during threading and unthreading movement of said coupling upon said nozzle, a float slidable on said tubular housing and having means thereon for actuating said switch.

2. The invention defined in claim 1 further comprising a radially outwardly projecting flange on said housing in adjacent spaced relationship to said other end, and annular seal means engaged between said flange and said screw coupling member.

3. The invention defined in claim 1 wherein said bore extends entirely through said plug member, and said means fixedly and sealingly closing said remote end of said bore comprises a cover plate welded to said second surface.

4. The invention defined in claim 1 wherein said bore has a closed inner end, and said connector means includes recessed contact shoes engageable with connector strips located on an edge of said circuit board means.

5. The invention defined in claim 1 wherein said plug member includes an arm extending radially outwardly from said screw coupling member, means defining a recess in said reservoir, and said means or said plug member comprises a positioning member fixed to said arm and projecting from said arm to be received in said recess to positively lock said plug member against rotative movement relative to said reservoir.

* * * * *